United States Patent [19]

Sassmannshausen et al.

[11] 4,093,785
[45] June 6, 1978

[54] LIGHTER LEAD STORAGE BATTERY

[75] Inventors: Günter Sassmannshausen; Dieter Hasenauer, both of Brilon, Germany

[73] Assignee: Accumulatorenwerk Hoppecke Carl Zoellner & Sohn, Cologne, Germany

[21] Appl. No.: 756,438

[22] Filed: Jan. 3, 1977

[30] Foreign Application Priority Data

Jan. 20, 1976 Germany .............................. 2601975

[51] Int. Cl.² .............................................. H01M 6/42
[52] U.S. Cl. ................................... 429/149; 429/156; 429/181; 429/185; 429/204; 429/225
[58] Field of Search ................................. 429/156–160, 429/178–185, 208, 211, 204, 225–228, 9, 149

[56] References Cited

U.S. PATENT DOCUMENTS

| 2,066,010 | 12/1936 | Lindem | 429/156 X |
| 2,642,469 | 6/1953 | Gary, Jr. | 429/156 X |
| 3,781,175 | 12/1973 | Kinsey | 429/160 X |
| 3,836,401 | 9/1974 | Niklos | 429/158 X |
| 3,945,852 | 3/1976 | Dey | 429/208 |

Primary Examiner—Charles F. LeFevour
Attorney, Agent, or Firm—Martin A. Farber

[57] ABSTRACT

A lead storage battery with positive and negative plates, the contact lugs of which respectively are connected with one another by lug bridges. The grid upper part of each plate grid is covered with an acid resistant synthetic material covering, which synthetic material covering surrounds the contact lugs acid-tight, the synthetic material covering being connected acid tight with the cell cover or one-piece composition case cover. The lug bridges are connected with one another outside of the acid space of the contact lugs.

20 Claims, 7 Drawing Figures

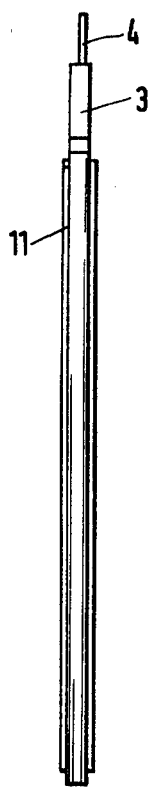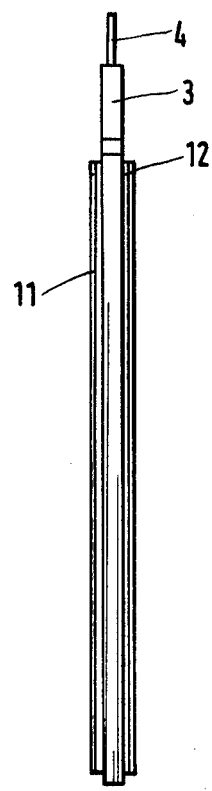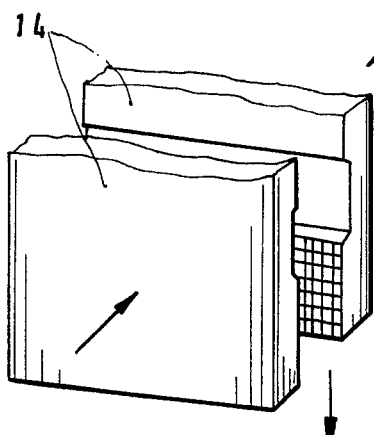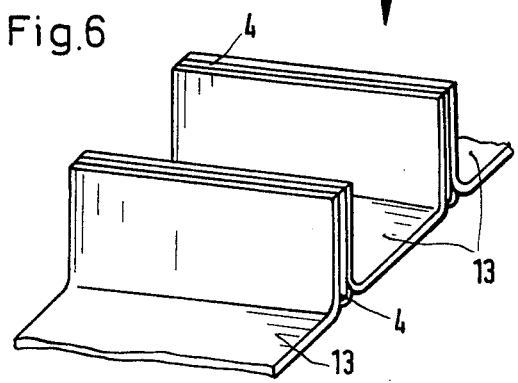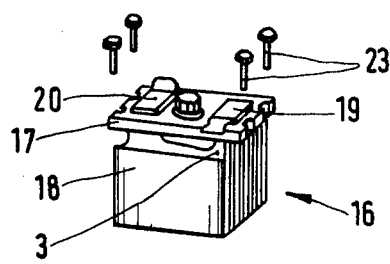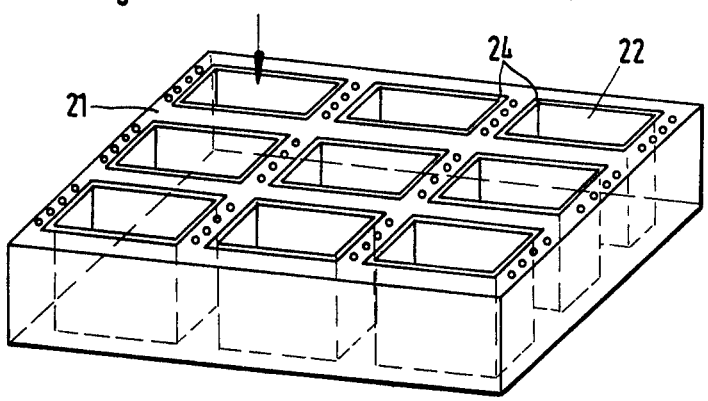

LIGHTER LEAD STORAGE BATTERY

The present invention relates to a lead storage battery with positive and negative plates, the contact lugs of which respectively are connected with one another by lug bridges.

A reduction of the weight is desired for storage batteries of the lead-sulphuric acid type in the form of starter batteries as well as in the form of traction batteries for economical and technical reasons.

The purpose and object of the present invention is to provide a storage battery construction which makes it possible to construct batteries with a low weight.

The presently known lead storage batteries have in addition to pasted-in or shaken-in lead connections for the active pastes, a very large amount of lead in the connections and poles. The use of, for example, lead coated or treated aluminum, copper or titanium as connection material for reduction of the weight and for lowering of the electrical loses, conditioned on the poor electrical conductivity of the lead, is known. With the use of such materials, however, difficulties arise with the production of the connections of the grids and with the lead lining or treating as well as with the leading out of the current conduits from the acid space.

It is an object of the present invention to provide a light lead storage battery of high mechanical rigidity of its parts with electrolyte -tight or -sealed takeoff cover which is of simple production and particularly facilitates a simple manufacture of test batteries, as well as permitting economical fast production.

It is another object of the present invention, as an aid in the solution of the above mentioned object, to provide in combination the covering of the grid upper part of each plate grid with an acid resistant synthetic material covering, which synthetic material covering surrounds acid tightly the contact lugs, the synthetic material covering being connected acid tight with the cell cover or one-piece composition case cover, preferably by welding, and the lug bridges (13, 19, 20) are connected with one another outside of the acid space of the contact lugs. By this teaching of the invention it is possible to save a large amount of lead and consequently weight in the connections and poles, to achieve a high mechanical strength and rigidity of the plate grids and to produce an electrolyte tight current takeoff, whereby the grid lugs are connected outside of the acid space, by which the voltage drop of the heretofore connection elements is considerably reduced.

According to an advantageous formation of the invention, the lug bridges for the connection of the grid lugs with one another can be made of light or highly conductive metals or metal compounds in the form of strands or sheets or sheet metal. As contact material particularly aluminum or copper is a possibility. The strand-shaped or sheet-shaped material can be welded or soldered with the contact bridges outside of the acid space, whereby an ease of production is provided. Preferably the lug bridges are U-shaped in cross-section. Such a strand, which is bent in U-form, or plate, can be inserted between the lugs, so that the legs point upwardly, whereby the soldering or welding is facilitated with a welding tong. Also a press connection can be produced by use of a high compression pressure.

In use on traction batteries the connection between the cell cases can be brought about by flexible flat strands or wires, whereby the cell poles can be eliminated. This together with the elimination of the lead bridges provides a substantial weight savings. Moreover it can be advantageous to embed or countersink the contact lugs and the lug bridges recessed in the cover case and the recessing can be poured out, plugged, sealed or covered with insulating material, whereby an additional protection against corrosion of the cell connections may be achieved.

By the construction in accordance with the present invention a new assembly of the storage battery cells and also of a block battery, respectively, is made possible. In this manner for attaining of higher strength and rigidity, it can be advantageous to equip the synthetic material covering with one or more projections (6) on places remote and spaced from the contact lugs, the projections being provided for the connections with the cover. It is also then advantageous, to weld, or to adhere or to rivet the lining or separators on the positive or negative plates. Then the negative and positive plates first are welded onto the cell cover and block cover, respectively, and thus so pre-assembled are pushed into the cell-case and block-case, respectively. The welding of the cover on the case takes place together with the insertion or pushing-in of the plates. By the securing of the plates onto the closure cover, a simple assembly and deassembly of a battery is made possible, which constitutes cell spaces formed integrally or integrated in the battery tank. A complete synthetic material tank in a self-supporting or -carrying manner of construction and foamed embodiment can be used. In this manner the sealing of the cell spaces can be brought about with a sealing element, 0-ring or flat rubber. The necessary pressing or application pressure is produced by the screwing-on fastening or bolting of the cell cover.

With the above and other objects and advantages in view, the present invention will become more clearly understood in connection with the following detailed description of preferred embodiments, when considered with the accompanying drawings, of which:

FIG. 3 is a side view of a negative plate with fastened separator;

FIG. 4 is a side elevational view of a positive plate with rigidly fastened support material and fastened separator;

FIG. 6 is a perspective view of another embodiment of a connection of the lugs of the plates with a schematically illustrated welding device; and FIG. 7 is a schematic view of a pre-fabricated accumulator element for assembly in a battery tank or traction battery.

Figure 1:
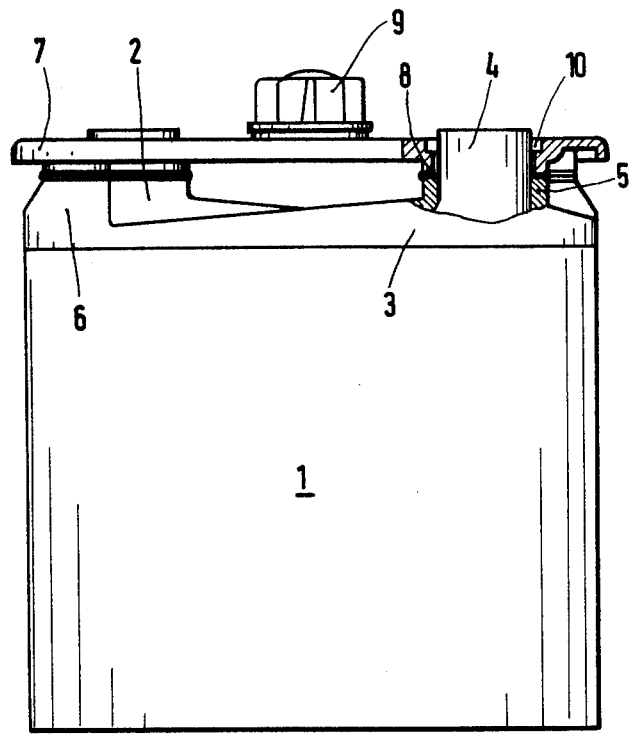
FIG. 1 is a front side elevational view of a plurality of accumulator or storage battery plates welded on a cover.
Figure 2:
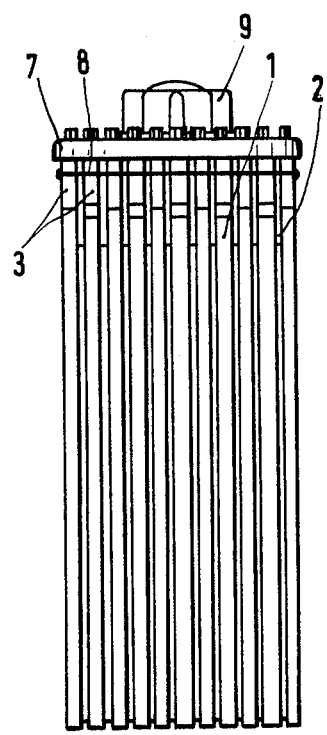
FIG. 2 is a side view of the arrangement of FIG. 1.

Referring now to the drawings, and particularly to FIGS. 1 and 2, the construction illustrated therein comprises a plurality of negative storage battery plates 1 and a plurality of positive storage battery plates 2. Liners or separators (not shown) are disposed between the plates 1 and 2, or constructed therein. The plates may have a conventional type structure, or a wire grid of the type as described in German patent application P 25 58 815.2, and are provided in the upper range thereof with a synthetic material or plastic covering 3 made of polyethylene or polypropylene. The synthetic material covering 3 surrounds a contact lug 4, which corresponds thereto, in an acid tight or electrolyte tight or sealing manner, in the manner that it has a flange-like drawn-up or rising range 5 which is illustrated in section in FIG. 1 of the drawings. Moreover the synthetic material covering 3 is formed in integral construction with a high rising projection 6 provided on its end opposite to the contact lug 4.

The negative and positive storage plates 1 and 2 are assembled into a plate packet and under circumstances respectively, with the flange range 5 and the projection 6 of the synthetic material covering 3 welded to a cell cover 7, as evident by the weld joint 8 illustrated in FIG. 1 and FIG. 2 of the drawings. The cell cover 7 has a customary opening with an inspection or vent plug 9. Moreover, by means of openings 10 in the cell cover 7, the contact lug 4, surrounded acid tight or electrolyte tight by the synthetic material covering 3, is led high such that it lies after assembling of the lead storage battery outside of its electrolyte or acid space. The synthetic material covering 3 in its turn brings about a weakening of the mechanical rigidity of the plates and facilitates on the other hand the non-spillable or electrolyte tight extension through the flange range 5 of each contact lug 4 outwardly through the cell cover 7. It can be manufactured by injection molding, pressing, pouring or casting, or gluing or pasting of the pre-fabricated synthetic material parts and is connected with the grid of the respective plate, under circumstances.

FIG. 3 shows a negative plate with a liner or separator 11 fixed thereto. The separator 11 can also be fastened to the support material 12 of a positive plate in accordance with FIG. 4 of the drawings.

Figure 5:
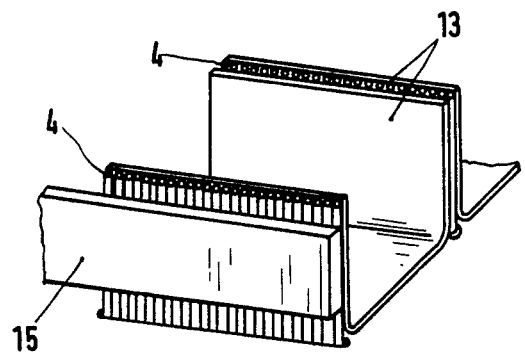
FIG. 5 is a perspective view showing a connection of the lugs of the plates in schematic detailed broken-away showing.

Referring now to the drawings and more particularly to FIGS. 5 and 6, a connection of the individual contact lugs 4 to one another is shown. According to the embodiment of FIG. 5, the contact lugs 4 comprise individual wires of a wire-plate grid. The contact lugs can also however be poured or cast or injection molded according to the embodiment of FIG. 6. For the connection therein a U-form bent strand 13 is laid between the contact lugs 4 such that the free U-legs engage and enclose the contact lugs 4, whereby the closed connection range of the U-legs is arranged on the cell cover. By means of welding tongs 14 the U-form-strand 13 is welded with the contact lugs 4 as schematically indicated in FIG. 6 of the drawing. Instead of a strand (or wire), also a correspondingly bent sheet can be used. If individual cells are connected to one another, this can take place by means of a connection wire or connection sheet 15, which likewise can be soldered on or pressed on.

Referring now to FIG. 7 of the drawings, a cell 16 prefabricated in the above-described manner is shown comprising plates 18 welded on a cell cover 17, which plates 18 respectively under the circumstances have a synthetic material covering 3 of the above-described formation. The respective contact lug is outwardly directed acid tight or electrolyte tight through the cell cover 17 and the connection is produced by lug bridges 19, 20.

One such cell 16 is as indicated by the arrow in the drawing of FIG. 7, inserted in a tank 21, which has integrated or integral cell spaces 22 formed therein. The cells covers 17 are then each screwed on the tank 21 with four screws 23 each. The sealing of the cell space 22 takes place over a sealing or leak-proof element 24, which is inserted in a corresponding recess in the tank 21 on each cell space.

While we have disclosed several embodiments of the present invention, these embodiments are given by example and not in a limiting sense.

We claim:

1. A lead storage battery comprising in combination
   a lead-sulfuric acid battery defining therein an acid space,
   a plurality of plate grids disposed in said acid space and each having a grid upper part,
   an acid resistant synthetic material completely covering said grid upper part and having a substantially trapezoidal shape,
   a contact lug extending upwardly from one side of each of said plate grids, respectively through said synthetic material, said synthetic material forming an upwardly extending flange range covering and acid-tightly surrounding a portion of said contact lug,
   said synthetic material constitutes a synthetic material covering having at least one projection spaced from said contact lugs on an opposite end of said plate grids,
   a cover being connected acid-tight with said synthetic material covering at said projection and at said flange range around said contact lugs, said cover defining openings around said contact lugs through which said contact lugs extend,
   lug bridges, disposed outside of the acid space on a side of said cover remote from the acid space, connecting said contact lugs with one another.

2. The lead storage battery as set forth in claim 1, wherein said cover is welded to said synthetic material.

3. The lead storage battery as set forth in claim 2, wherein said contact lugs are injection molded.

4. The lead storage battery as set forth in claim 1, wherein, said cover constitutes a cell cover.

5. The lead storage battery as set forth in claim 1, wherein
   said cover constitutes a one-piece composition case cover.

6. The lead storage battery as set forth in claim 1, wherein
   said lug bridges are made of highly conductive metals in the form of strands or sheets connected with said contact lugs.

7. The lead storage battery as set forth in claim 6, wherein said lug bridges are welded to said contact lugs.

8. The lead storage battery as set forth in claim 6, wherein said lug bridges are soldered to said contact lugs.

9. The lead storage battery as set forth in claim 1, wherein
   said lug bridges are made of metal or metal compounds selected from the group consisting of aluminum and copper.

10. The lead storage battery as set forth in claim 1, wherein
    said contact lugs and said lug bridges are embeded recessed in said cover defining a recessing, and
    insulating material sealing and covering, respectively, said recessing.

11. The lead storage battery as set forth in claim 1, further comprising
    separators secured on at least one of the negative or positive plates.

12. The lead storage battery as set forth in claim 11, wherein said separators are welded on the negative or positive plate.

13. The lead storage battery as set forth in claim 11, wherein said separators are adhesively fastened on the negative or positive plate.

14. The lead storage battery as set forth in claim 1, wherein
said contact lugs are made of wire in the form of combined assembled wires.

15. The lead storage battery as set forth in claim 1, wherein
said contact lugs are made of wire in the form of bent individual wires.

16. The lead storage battery as set forth in claim 1, wherein said contact lugs constitute casted members.

17. The lead storage battery as set forth in claim 1, further comprising
a battery tank,
a plurality of said lead storage batteries assembled in said battery tank constituting a traction battery.

18. The lead storage battery as set forth in claim 1, wherein said synthetic material is polyethylene.

19. The lead storage battery as set forth in claim 1, wherein said synthetic material is polypropylene.

20. A lead storage battery having an acid space, with positive and negative plates, and having contact lugs respectively connected with one another respectively by means of lug bridges, comprising in combination
a plurality of plate grids each having a grid upper part,
an acid resistant synthetic material covering said grid upper part,
a contact lug extending upwardly from said plate grids, respectively,
said synthetic material covering and acid-tightly surrounding said contact lug,
a cover being connected acid-tight with said synthetic material,
lug bridges, disposed outside of the acid space, connecting said contact lugs with one another, said lug bridges have a U-shaped cross-section with upwardly pointing legs, the latter are connected to adjacent of said contact lugs on outwardly facing surfaces of said legs.

* * * * *